(12) United States Patent
Evslin et al.

(10) Patent No.: US 7,154,878 B1
(45) Date of Patent: Dec. 26, 2006

(54) INTEGRATED NETWORK

(75) Inventors: Tom Evslin, Princeton, NJ (US); James Yu, Holmdel, NJ (US); Thomas Shoemaker, Bridgewater, NJ (US)

(73) Assignee: ITXC IP Holdings S.A.R.L., Luxembourg (LU)

( * ) Notice: Subject to any disclaimer, the term of this patent is extended or adjusted under 35 U.S.C. 154(b) by 583 days.

(21) Appl. No.: 09/636,660

(22) Filed: Aug. 11, 2000

(51) Int. Cl.
*H04L 12/66* (2006.01)

(52) U.S. Cl. .................... 370/352; 370/395.2

(58) Field of Classification Search ............. 370/352, 370/357, 389, 400, 401, 395.2, 395.31, 395.52; 709/223, 225, 227, 238
See application file for complete search history.

(56) References Cited

U.S. PATENT DOCUMENTS

| 5,428,608 | A  | * | 6/1995 | Freeman et al. ............ 370/261 |
| 6,122,502 | A  | * | 9/2000 | Grundvig et al. ......... 455/414.1 |
| 6,373,926 | B1 | * | 4/2002 | Foladare et al. .......... 379/88.13 |
| 6,374,302 | B1 | * | 4/2002 | Galasso et al. ............ 709/238 |
| 6,587,867 | B1 | * | 7/2003 | Miller et al. ................ 709/200 |

* cited by examiner

*Primary Examiner*—Brian Nguyen
(74) *Attorney, Agent, or Firm*—Kaplan Gilman Gibson & Dernier LLP

(57) ABSTRACT

A method and apparatus for completing call or contacts over a network based upon an identifier. The contacting party sends a message requesting contact with the contacted party, and the system locates the contacted party via a data network or telephone address specified preferably by the contacted party.

17 Claims, 2 Drawing Sheets

INTEGRATED NETWORK

TECHNICAL FIELD

This invention relates to telephony and data communications, and more particularly, to an improved method and apparatus for merging the functionality of a telephone network with that of a data network. In a preferred embodiment, the data network is a packet switching network such as the Internet.

BACKGROUND OF THE INVENTION

The Internet and similar data communications networks have become the communications medium of choice. Recently, communications previously transmitted over circuit switched networks are being transmitted more and more over packet switched networks, such as the Internet. Thus, for example, present day art includes a variety of examples of voice telephone calls and facsimile images being transmitted as packetized data over the Internet. Unfortunately, the merging of the Internet and the public switched telephone network (PSTN) has been less than perfect. One reason is that the Internet and the PSTN have separate addressing schemes. In the Internet, a person is denoted by a logical address which may be accessed from any physical location. In the PSTN, the addresses (i.e., telephone numbers) denote physical locations (i.e., telephone extensions), which may be utilized by any person.

Some systems exist in present art which provide for the exchange of data between the PSTN and the Internet. For example, U.S. Pat. No. 5,428,608 provides a technique for allowing a modem to communicate over the PSTN and to separately route data calls over the Internet. Although the '608 patent provides a technique for permitting similar equipment to communicate over both the PSTN and the Internet, the '608 patent contains several major drawbacks. The most important drawback is that this patent fails to solve the problem of different addressing schemes of the two networks, and the associated burden that it places upon users.

In view of the above, there exists a need in the art for an improved technique of communicating over both the Internet and the PSTN.

SUMMARY OF THE INVENTION

The above and other problems of the prior art are overcome in accordance with the present invention which relates to an integrated system for data, voice, and other communications. In accordance with the present invention, a server interfaces with both a data network and the PSTN. The server includes a mechanism for finding contact information for contacted parties. The party is then contacted to complete a call via Internet Protocal (IP) telephony or IP telephony in combination with other forms of media.

If the contacted party is a member of the same "community" as the contacting party, the local server completes the contact. If the contacted party is not a member of the local community, the server determines, from a remote domain name server (DNS), the appropriate local server for the contacted party. A data network connection is then formed between the local server for the contacted party and the local server for the contacting party. The contact is then completed by the local server for the contacted party.

Call completion may occur over the Internet or PSTN, or a combination of both, yet the identifier entered by the calling party to identify the called party would be the same. The server in the same local "community" as the called party performs a table lookup and translates an identifier entered by the calling party into a network address on either the telephone network or the Internet. Moreover, the table lookup also ascertains which network should be used to complete the call.

DETAILED DESCRIPTION OF THE PREFERRED EMBODIMENT

Figure 1:
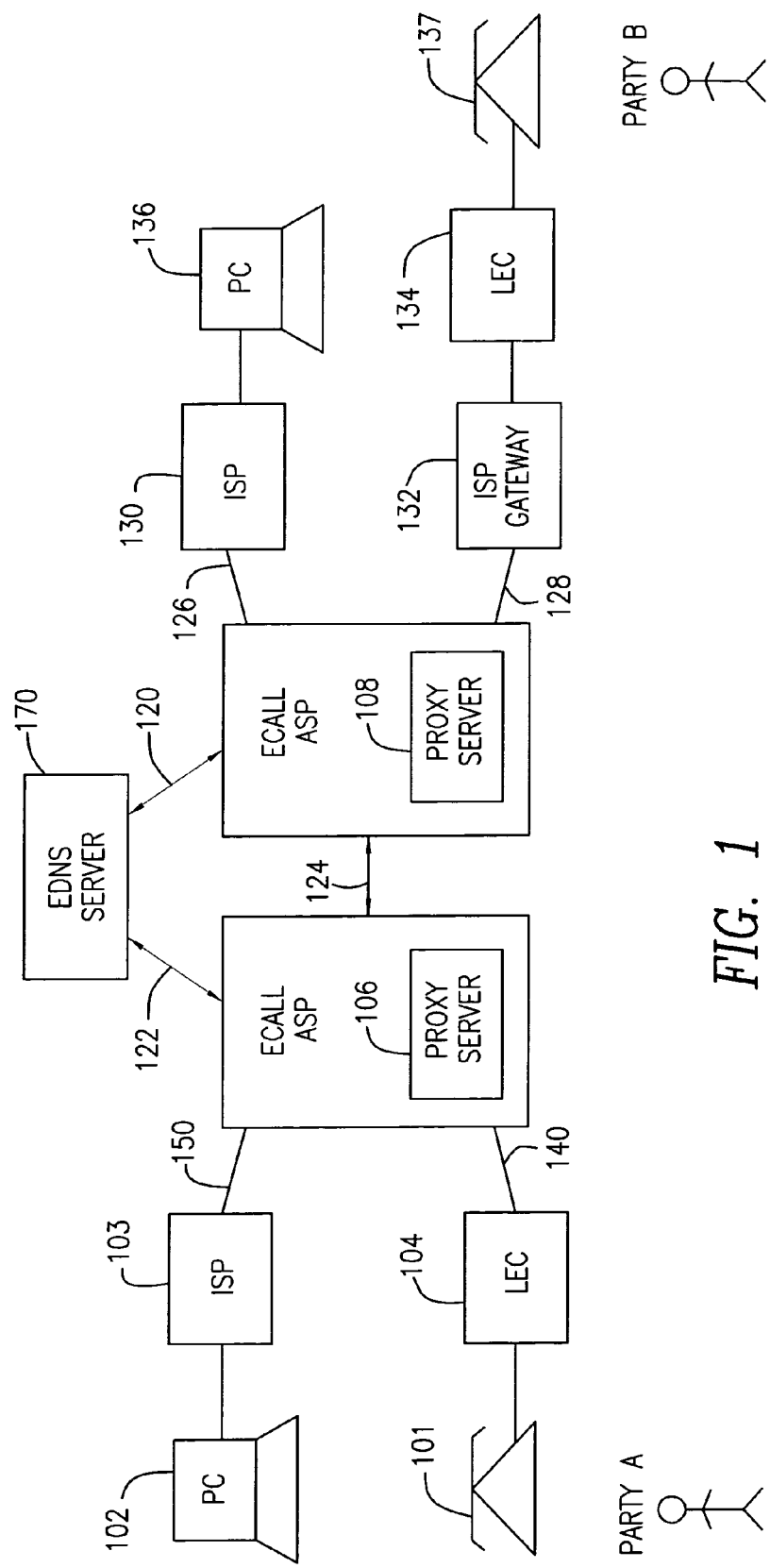
FIG. 1 shows an architectural diagram for an exemplary embodiment of the present invention.

FIG. 1 shows an exemplary architectural diagram of a first embodiment of the present invention. The arrangement of FIG. 1 includes two ecall proxy servers 106 and 108, each connected to an Internet service provider 103 and 130 respectively. Each of the proxy servers 106 and 108 is also connected to a local exchange carrier (LEC) 104 and 134 respectively. Communications links 122, 120 and 124 may represent communications that occur over the Internet or any other data network. Preferably, such data network is a packet switched data network.

The Ecall proxy servers 106 and 108, or just servers, are responsible for interfacing to the public networks, including the Internet and the PSTN. Notably, each ecall server may be implemented by a third party application service provider (ASP), so that the functionality of the servers may actually be split among several servers.

Telephone device 137 interfaces over an Internet Protocol (IP) communications link 128 through an Internet Service Provider (ISP) gateway 132. In an alternative embodiment, telephone devices such as 101 may interface directly with proxy server 106 through LEC 104. In such a case, communications link 140 would be a circuit switched Public Switched Telephone Network (PSTN) link, and server 106 would include the appropriate hardware find software for converting the communications on communications link 140 into packetized IP information.

In order to explain the operation of the exemplary embodiment described in FIG. 1, we presume that party A wishes to contact party B. Note that we use the term "contact," rather than "call." The contact may be comprised of voice communications (e.g., a telephone call) or it may include contact via e-mail with a live web chat or other media. Importantly, in accordance with the teachings of the present invention, party A need not even be aware of the type of contact that will be ultimately implemented. Instead, party A may initiate the contact using PSTN, IP, etc., and party B may be contacted, at his option, utilizing any of the foregoing. In a preferred embodiment, party B may be contacted by establishing a voice over IP connection between a computer and the server.

For purposes of explanation, presume that party A picks up the telephone 101 and dials the telephone number of party B. The telephone number of party B is mapped by LEC 104 to communications line 140 and connected to proxy server 106. The call from telephone 101 to proxy server 106 is completed in the conventional manner used by the PSTN. We also note that between LEC 104 and proxy server 106, it is possible to interpose an ISP gateway such as that shown as 132. In such a case, the PSTN call on communications link 140 would be converted to IP prior to being completed to proxy server 106.

If a connection is made to the server 106, the identifier of called party B may be entered using touch tones or other signaling. Thus, party A could enter an email address of party B that is used to locate the local server to party B.

Proxy server 106 acts in a manner loosely analogous to the local exchange in a telephone network. More specifically, proxy server 106 includes a table of parties to be contacted which are members of the local community of proxy server 106. In the data network world, proxy server 106 might represent a company domain name, such as acme.com, and the parties within proxy server 106 would include all of the employees. In the present art, e-mail systems typically work in a similar manner, with the server for a particular company having a record of each and every e-mail address within that domain name. For purposes of explanation herein, a proxy server is said to be associated with a community in which a party X is contained if the server has stored the contact information (i.e.; network address) for that party X.

If the contacted party B is a member of the particular domain represented by proxy server 106, then the contact may be completed by establishing a connection to the appropriate party B. Whether that contact is completed via e-mail, voicemail, or telephone, and whether the connection from proxy server 106 to the contacted party is over the Internet or the PSTN is of no concern to party A. Instead, the proxy server 106 includes a table which defines how contacts to party B should be made.

If the contacted party B is not a member of the local community of proxy server 106, then proxy server 106 contacts via communications link 122, a DNS server 170. The DNS server 170 includes the appropriate data and/or communications in order to determine a logical network address of the contacted party B. The DNS server 170 operates in a manner similar to the way an e-mail address is located for a receiving party in today's e-mail systems. Thus, the DNS server 170 would typically determine not the actual location or logical address of the particular contacted party B, but rather, the network address of proxy server 108. By analogy, in today's world, if an e-mail is sent to Joe at ITXC.com, the DNS server 170 would typically locate the network address of ITXC.com. The responsibility of forwarding the communication to the particular e-mail address within the domain name would normally be placed upon the local email host for ITXC.com.

Once the DNS server 170 locates the network address of the proxy server 108 of which contacted party B is a member, a communications link 124 is established between proxy server 106 and proxy server 108. The communications link 124 would typically be an IP communications link over the Internet, although it is possible that portions of the link may be implemented using the Internet while other portions may be implemented using the PSTN.

Once the proxy server 108 is located and the communications link is established, the call set-up process continues at proxy server 108. Proxy server 108 checks a table of addresses and locates the particular contacted party B. Within the record for contact party B, is the appropriate network address. Note that the network address also includes information indicative of which type of contact should be made from Proxy Server 108 to party B. Thus, the record within proxy server 108 may instruct the system to contact party B over the PSTN and a particular telephone number, or it may instruct proxy server 108 to establish an IP call to an audio equipped PC 136 through an ISP 130 or to a hand held or other device. The party A placing the contact has no need to be aware of the particular type of contact between proxy server 108 and party B.

Notably, party B itself may determine through a graphical user interface (GUI) the particular contact information used by proxy server 108 in order to contact party B. Party B may specify to proxy server 108 that an IP voice communications should be established to a particular "softphone" within the PC 136. Alternatively, party B may specify that a particular telephone number over the PSTN should be dialed. Notably, server 108 may also optionally contain an interface directly to the PSTN. This would allow a potential contacted party to specify virtually any technique that it wants to be used for potential contacts. Moreover, the technique used to contact the contacted party may vary depending upon who the contacting party is. For example, if the contact is initiated from a telephone, the caller ID is known. If the contact is initiated from another computer, over the Internet, the e-mail address will be known. Server 108 may use this data to assign certain contacts to IP calls, while others are sent to a cell phone over the PSTN.

Figure 2:
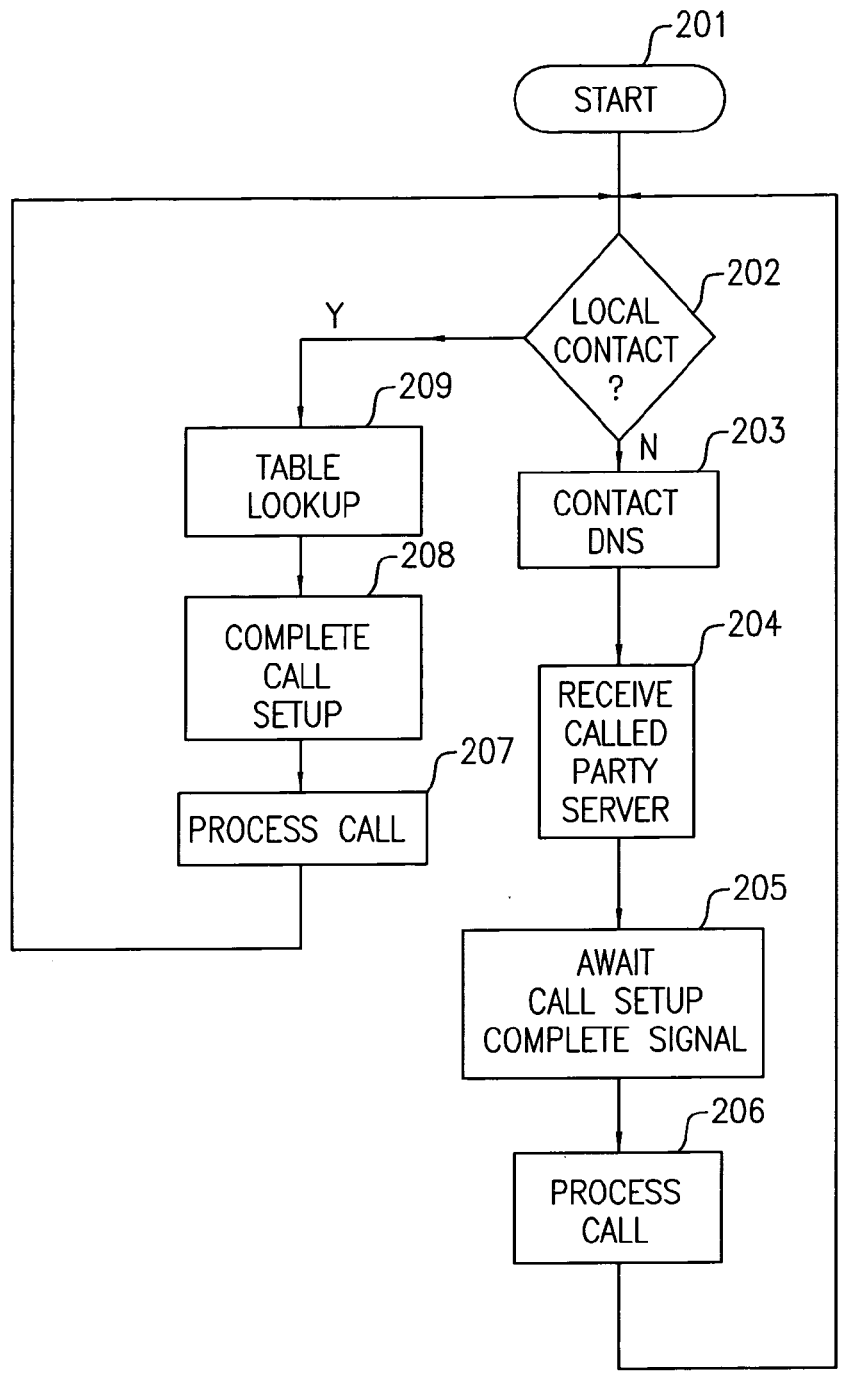
FIG. 2 shows a flow chart of the functions to be implemented at the proxy server of the contacting party.

FIG. 2 depicts an exemplary flow chart to implement the teachings of the present invention in proxy server 106. At start 201, the processing begins and incoming contact is received either on exemplary communications links 140 or 150. Proxy server 106 first ascertains whether or not the incoming contact is a local contact. If so, a table look up is performed at block 209, and decision block 202 determines if the parameters for contacting the contacted party are within proxy server 106. If so, a contact will be initiated through proxy server 106 either over the Internet, PSTN, or a combination of both as previously described. The decision as to whether the contact should be completed via an Internet or PSTN connection may be included within information stored on server 106.

If the party to be contacted is in the local community of server 106, then the server 106 determines from a table lookup 209 the appropriate contact information for the party to be contacted. Such information may include a network address, the network over which the contacted party desires to be contacted, etc. Call setup is then completed at block 208, and the processing of the call proceeds at block 207.

Alternatively, if the party to be contacted is not a member of the local community of interest of server 106, then server 106 contacts the DNS server 170 to determine which server is the server that has the contacted party within its local community of interest. The contacted party's identifier, which may be an email or "ecall" address, is transmitted from server 106 to DNS server 170. The DNS server 170 may be a network or servers and other computers. In any event, the DNS server 170 return to the server 106 the network address of the server 108 that is part of the community of interest of the party to be contacted. In FIG. 2, this is shown functionally at block 204.

Upon server 106 receiving the network address of server 108, control is transferred to block 205 where server 106 initiates a data network connection to establish a communications session 124 over the packet switched network. As indicated at block 205, server 106 then enters a wait state, to allow server 108 to set up the final leg of the contact with the contacted party. Note that during the establishment of the communications session over 124, the identifier of contacting party may be sent to server 108. Server 108 then sets up the call using the technique specified by the contacted party, and signals server 106 that the call set up. At block 206, the call takes place and the system then return to the top of the flow chart in FIG. 2 to process other calls.

Notably, the system allows a single email or ecall address to be utilized irrespective of whether the contacted party will ultimately be contacted over the Internet or the PSTN. The system also allows the potential contacted party to specify which network and network address to use, and when and how to contact the party. The contacting party need only be aware of one ecall or email address.

The client software to assist in initiating the contact may include a single icon that can be selected for either email or ecall. The user would then be asked to select whether email or ecall is desired. The client software would then send either an email message or a request for a call as previously outlined. Notably, if a request for a call is sent, the initiator does not need to know whether such will ultimately terminate via the PSTN or the Internet. Moreover, the initiator does not need to know whether the party being contacted is in the same community as the contacting party or not.

While the above describes the preferred embodiment of the invention, various other modifications and additions will be apparent to those of skill in the art. Such modifications are intented to be covered by the following claims.

What is claimed is:

1. An apparatus, comprising:
   a stored table of information indicative of a plurality of parties to be contacted and within a local community of interest corresponding to a specified set of one or more computers and to which said apparatus can directly route said contact, the stored table including a network address for each party within said local community of interest, and an indicator of which of at least two networks over which said contacted party desires to be contacted;
   at least two network interface units, each for interfacing to a separate one of the at least two networks for receiving requests to contact parties; and
   a processor for determining if a request, made over a packet switched data network of said at least two networks, to contact a party is within said local community of interest, and if so, completing the contact at the address and over the network stored in the table, and if not, sending the contact to a different server over the Internet.

2. The apparatus of claim 1, wherein two of said networks are the Public Switched Telephone Network (PSTN) and the Internet.

3. The apparatus of claim 2, wherein the processor is configured to contact a Domain Name Server (DNS) over the Internet if the party to be contacted is not in the local community of interest.

4. The apparatus of claim 3, further comprising a means to receive information from the DNS, to parse the information to ascertain a network address of a second server having a local community of interest of which the party to be contacted is a part, and for establishing communications over the Internet between said apparatus and said second server.

5. The apparatus of claim 4, further comprising a transmitter for monitoring signals received from the second server during call setup, and for determining when to begin transmission of audio communications.

6. A method of completing a telephone call from a calling party to a called party, the method comprising:
   receiving, at a first server, an identification of the called party and request, made over a data network, to complete the telephone call to said called party;
   ascertaining, at said first server, if said first server is capable of completing the telephone call;
   if not, contacting a second server to ascertain an identity of a third server that is capable of completing the telephone call;
   establishing a data connection between said first and third servers;
   establishing a data communications session between said first and third servers;
   completing the telephone call by forming a communications channel between the third server and either a computer or a telephone associated with the called party, and wherein the third server includes a stored table specifying whether said communications channel is to be formed over the data network or a telephone network, and whether the calling and called party are within the same community of interest.

7. The method of claim 6, wherein said identification of the called party includes an email address associated with the called party.

8. The method of claim 6, further comprising the steps of presenting a graphical user interface to the called party prior to said telephone call and accepting input to update said table through said graphical user interface.

9. The method of claim 8, wherein said table includes at least one table entry for said called party that comprises plural addresses for contacting said called party, and wherein at least one of those addresses is that of the data network, and at least another of said addresses is that of telephone network.

10. The method of claim 9, wherein the address that is that of the data network is an address connected to a computer with a soft phone.

11. A method of completing a call from a calling party to a called party, the called party having network address on a packet switched network, the method comprising:
    dialing a number and thereby establishing a first connection between the calling party and a first server to request said call over said packet switched network;
    transmitting over said first connection an identifier associated with the called party;
    determining, from said identifier, whether said called party has a network address that is part of a community associated with said first server, and if so, completing the call by establishing a communications session between said first server and said called party;
    if said called party is not part of a community associated with said first server, contacting a second server to determine a third server having a community of which said called party is a part, and
    completing the call by establishing a data network connection between said first server and said third server, and between said third server and the called party, wherein one of said servers contains a table that comprises information indicative of which one of at least two networks are to be used to contact the called party.

12. The method of claim 11, further comprising the step of, if said called party is not a part of a community associated with said first server, establishing a data network connection between said third server and a computer, and between said computer and a voice enabled device.

13. The method of claim 11, wherein said step of transmitting comprises the step of pressing digits to generate tones indicative the network address of the called party.

14. The method of claim 12, wherein said network address is that of a gateway that interfaces the packet switched network to a public switched telephone network.

15. The method of claim 14, wherein said network address is associated with a computer equipped with a voice capability.

16. The method of claim 11, wherein said table includes the identifier, and wherein the network address associated with said identifier in the table may be changed by said called party, and wherein said request remains the same irrespective of changes made to the table.

17. The method of claim 16, wherein the table comprises several prioritized sets of information to contact the called party, at least one of which includes an address on a telephone network, and at least another of which includes an address on said packet switched network.

* * * * *